United States Patent Office 3,652,472
Patented Mar. 28, 1972

3,652,472
STABLE DISPERSIONS OF CROSS-LINKED ADDITION POLYMER AND PROCESS OF PREPARING SAID DISPERSIONS
Michael Raymond Clarke, Frankston, Victoria, and Leon Filipowicz, East St. Kilda, Victoria, Australia, assignors to Balm Paints Limited, Melbourne, Victoria, Australia
No Drawing. Filed Oct. 15, 1968, Ser. No. 767,802
Claims priority, application Australia, Oct. 27, 1967, 29,088/67
Int. Cl. C08f 47/18; C09d 5/02
U.S. Cl. 260—22 CB         14 Claims

ABSTRACT OF THE DISCLOSURE

A process of preparing stable dispersions of cross-linked addition polymer in an organic liquid by first preparing a dispersion of a suitably chemically reactive addition polymer and then cross-linking it with a cross-linking agent which is at least difunctional with respect to the cross-linking reaction. In one embodiment the cross-linked polymer is further cross-linkable by an autoxidative or free radical initiated cross-linking reaction or both.

---

This invention relates to a process of preparing dispersions of particles of cross-linked polymer in non-aqueous liquids and to stable dispersions of such particles.

It has been proposed to prepare dispersions of particles of cross-linked polymeric material by, for example, preforming the polymer in bulk and then milling it to the required particle size. The particles must then be dispersed and stabilized in the chosen liquid by suitable means. However, when the polymers are rubbery or excessively thermoplastic at normal grinding temperatures the milling has to be carried out at low temperatures, which is economically undesirable. If the cross-linked polymers are friable they may be readily ground at normal milling temperatures, but they can present other manufacturing problems, especially when made by bulk polymerization, due to their inherent high viscosities and difficulties in controlling the polymerization end point.

We have now found that certain classes of cross-linked polymers can be prepared in disperse particulate form in a non-aqueous liquid by a process to be described hereunder which avoids these limitations. The particles of cross-linked polymer are prepared by a polymerization and cross-linking process carried out in the liquid to form the dispersion. Also, the disperse particles may be recovered from the liquid as particulate solids which are re-dispersible and self-stabilizing in the liquid.

According to the present invention we provide a process of preparing stable dispersions of cross-linked addition polymer in an organic liquid by dispersion polymerization of α,β-ethylenically unsaturated monomer in an inert, substantially non-polar organic liquid and in the presence of a stabilizer as herein defined to provide an addition polymer containing on average at least one chemically reactive group per polymer molecule and reacting with the polymer so-formed at least one cross-linking agent bearing complementary chemically reactive groups said agent being at least difunctional with respect to the cross-linking reactions.

Preferably, and especially when the cross-linking agent is soluble in the inert organic liquid, the addition polymer is swollen by the addition to the dispersion of up to 25% by weight, based on the weight of disperse polymer, of a swelling agent for the polymer, before the cross-linking reaction is carried out.

We further provide stable dispersions of particles of cross-linked addition polymer in an organic liquid in the presence of a stabilizer as herein defined and further characterized in that on average at least one chemically reactive group per addition polymer molecule has been co-reacted with a cross-linking agent bearing complementary chemically reactive groups to cross-link the addition polymer said agent being at least difunctional with respect to the cross-linking reaction.

The cross-linked polymer particles may be separated from the dispersion as particulate solids which, because they are accompanied by the polymeric stabilizer are re-dispersible and self-stabilizing in an inert, substantially non-polar liquid. Accordingly, we also provide as particulate solids, a cross-linked addition polymer in which on average at least one chemically reactive group per polymer molecule has been co-reacted with a cross-linking agent bearing complementary chemically reactive groups to cross-link the addition polymer said agent being at least difunctional with respect to the cross-linking reaction and further characterized in that the particulate solids form self-stabilizing dispersions in an inert, substantially non-polar liquid.

In a preferred embodiment of the invention the polymer particles are further cross-linkable by an autoxidative or free radical initiated addition reaction.

By "dispersion polymerization" we mean a process of polymerizing monomer in an organic liquid in which the monomer is soluble and the resulting polymer is insoluble and forms disperse particles, the organic liquid containing a stabilizer for the disperse polymer particles comprising an anchoring component which becomes associated with the particles and a pendent chain-like component which is solvated by the organic liquid and provides a stabilizing sheath around the polymer particles. The liquid is inert with respect to the polymerization reaction. For the purpose of this invention the dispersion must be a very stable one, which we achieve by the use of stabilizers of high anchoring energy.

The preferred stabilizer may be a selected stabilizer of the type described in co-pending U.S. application No. 525,315 filed February 7, 1966, now abandoned in which the association is the result of interaction between acidic and basic groups in the stabilizer and disperse polymer, such interaction including hydrogen bonding, or between fixed dipoles in the stabilizer and complementary fixed or induced dipoles in the disperse polymer. The basis of selection is as follows:

In general, stabilizers as described in the above co-pending application in which the interaction between the stabilizer and the disperse polymer is an interaction between strong acids and strong bases, e.g. between carboxyl and amino groups, are satisfactory. However the invention is not limited to the use of this embodiment of the above application alone and we prefer to select suitable combinations of disperse polymer and stabilizer by the following practical test.

A stable dispersion of 50% by weight solids content of the desired addition polymer is prepared in the chosen inert organic liquid and stabilized by a stabilizer as described in the above co-pending application. To 132 parts by weight of the above dispersion are added with stirring over a period of five minutes, 90 parts by weight of a mixture of equal parts by weight of n-butyl benzyl phthalate, 2-ethoxy ethanol acetate and an aliphatic hydrocarbon. The dispersion so-treated is then stored in an oven at 45° C. If the dispersion remains stable for 48 hours at this temperature, the stabilizer is a satisfactory one for use, in the polymer/organic liquid system tested, according to this invention. If the dispersion gels or coagulates in less than 48 hours under the conditions of this test, the stabilizer is rejected as providing an insufficiently high anchoring energy in the polymer/ organic liquid system tested, for the performance of the invention.

Alternatively the stabilizer may be a polymeric stabilizer as described in co-pending U.S. application Ser. No. 740,469 filed June 27, 1968 in which the stabilizer associates with the disperse polymer particles and provides around the said particles a stabilizing steric barrier and characterized in that additionally the stabilizer is co-reacted with the disperse polymer to provide from 1 to 10, preferably from 1 to 4 covalent links per co-reacted stabilizer molecule with the disperse polymer.

Stabilizers having these properties are referred to throughout this specification as stabilizers as herein defined.

The co-reaction between the disperse polymer and the cross-linking agent will generally be an addition reaction and suitable pairs of complementary chemically reactive groups include, for example:

Acid anhydride group with hydroxyl group
Acid anhydride group with amine group
Acid anhydride group with mercaptan group
Epoxide group with acid group
Epoxide group with secondary amine group
Isocyanate group with hydroxyl group
Isocyanate group with amine group
Hemiformal group with amide group
Carbonate group with amine group
N-carbamyl cycloimide group with amine group
N-carbamyl cycloimide group with hydroxyl group The general conditions under which addition reactions take place between such pairs of groups are well known and it will be understood that the temperatures at which these reactions take place depend on the pairs of reactive groups selected and may also be modified by the use of catalysts. For example, the following are some typical suitable reaction conditions:

| Pairs of co-reactive groups | Catalyst | Temp., °C. |
| --- | --- | --- |
| Acid anhydride: alcohol hydroxyl | Triethylamine or N-dimethyl aniline. | 80–125 |
| Acid anhydride:amine | Nil | 20–125 |
| Epoxide:acid | Triethylamine | 80–125 |
| Epoxide:secondary amino | Nil | 20 100 |
| Isocyanate:alcohol hydroxyl | Stannous chloride or zinc chloride. | 30–125 |
| Isocyanate:amine | Nil | 20–100 |
| Carbonate:amine | Nil | (1) |
| N-carbamyl cycloimide:hydroxyl | Zinc chloride | 50–130 |
| N-carbamyl cycloimide:amine | Nil | 30–100 |

1 Room temperature.

By substantially non-polar liquid we mean a liquid of essential hydrocarbon character, either aliphatic or aromatic or a mixture of both, optionally containing a minor proportion, preferably not more than 30% by weight, of an ester, ketone or alcohol. The liquid must be inert with respect to the addition polymerization and cross-linking reaction.

Addition polymers sufficiently insoluble in such a non-polar liquid to be prepared therein by dispersion polymerization are derivable from, as monomers or co-monomers, one or more mono $\alpha,\beta$-ethylenically unsaturated monomers, e.g. vinyl chloride, vinyl acetate, vinylidene chloride, lower alkyl (meth)acrylate esters, lower diesters of maleic acid (anhydride) or itaconic acid, styrene, $\alpha$-methyl styrene and vinyl toluene.

The general requirement is that the addition polymer produced should be sufficiently polar relative to the liquid, or sufficiently self-associated or crystalline in structure to be insoluble in the liquid.

The reactive group may be provided in the addition polymer by use in the dispersion polymerization of an $\alpha,\beta$-ethylenically unsaturated monomer containing such a group. The addition polymer may be a homopolymer of such a monomer but usually it will be a copolymer derived from such a monomer containing the reactive group and co-monomer not containing a reactive group, the monomer usually being copolymerized in a minor proportion. Alternatively, the reactive group may be introduced by using a co-monomer providing a group which is converted in situ in the polymer to the required chemically reactive group. The number of chemically reactive groups in the addition polymer is not critical, the only requirement being that a sufficient number of such groups must be available in the polymer to react with the selected number of co-reacting groups borne by unsaturated components. An excess of chemically reactive groups over the stoichiometric proportion required for the co-reaction may be present in the addition polymer.

Suitable monomers providing reactive groups include, for example: maleic anhydride (acid) and itaconic acid, acid esters of maleic and itaconic acid, glycidyl (meth) acrylate, hydroxyalkyl (meth)acrylate, acrylamide, methacrylamide, dimethyl aminoethyl methacrylate, vinylidene carbonate and N-carbamyl maleimide.

The cross-linking agent may be at least difunctional in the sense that it provides at least two individual complementary chemically reactive groups, for example two carboxyl groups in the one molecule.

Alternatively a single reactive group may itself be difunctional with respect to the cross-linking reaction, in which case only one such group will meet our minimum requirements. For example if the addition polymer provides epoxide groups, a primary amine will react with two such groups and hence a cross-linking agent providing one primary amine as a complementary chemically reactive group will react difunctionally with such a polymer.

The nature of the residue of the cross-linking agent is related to the physical properties which the cross-links are to impart to the polymer. For example, a primary amine, e.g. n-butyl amine may be used to provide short, relatively inflexible cross-links and a methylol melamine for example will provide bulky, inflexible cross-links. By contrast, sebacic acid or poly(alkylene oxide) chains provide long, very flexible cross-links. As will be understood the greater the functionality of the cross-linking agent the more complex will be the polymer network formed on reaction with the disperse polymer. For example a particularly useful cross-linking agent which can produce a highly complex cross-linked disperse polymer is a polyester or alkyd resin having an acid value of, e.g. at least 30 mg. KOH per gm.

The cross-linking agent may, but need not be, soluble in the organic liquid (the continuous phase) of the dispersion and it may be a solid or a liquid. The important practical point is that it be present in the dispersion to be cross-linked in a liquid phase at the chosen reaction temperature. For example a particularly useful cross-linking agent for certain polymers is hexamethylene diamine, which is a solid at room temperature. We prefer to add this material to a dispersion as a solution in a suitable solvent, e.g. ethylene glycol diacetate.

When the cross-linking agent is soluble in the continuous phase of the dispersion and particularly when it is a long-chain compound, for example a dimer of a long-chain fatty acid, a cross-linked addition polymer prepared therefrom may be partly swollen by the continuous phase, but remains stably dispersed therein.

If the cross-linking agent is insoluble in the disperse polymer we prefer to add to the dispersion up to 25% by weight based on the weight of disperse polymer of a swelling agent for the polymer before the cross-linking reaction is carried out. The cross-linking agent should be soluble in the swelling agent at the cross-linking reaction temperature.

The cross-linking agent may itself be a swelling agent for the polymer, by which we mean an organic liquid which, at least in part, dissolves or solvates the disperse polymer at the reaction temperature. For example a copolymer of methyl methacrylate and maleic anhydride is swollen by a low molecular weight epoxide, e.g. glycidyl methacrylate, which will also cross-link the polymer by reaction of anhydride groups of the polymer with epoxide groups of the epoxide cross-linking agent, which in this reaction exhibits a functionality of two.

The cross-linked polymers of this invention may be made by first preparing a dispersion of the addition polymer in an inert organic liquid in the presence of the stabilizer, optionally forming at least one covalent link per co-reacted stabilizer molecule between the stabilizer and the disperse polymer, either concurrently with or subsequent to the polymerization reaction.

Suitable liquids in which to carry out the dispersion polymerization and the subsequent reaction with the cross-linking agent are, for example: aliphatic hydrocarbons such as pentane, hexane, heptane, and octane; aroamtic hydrocarbons such as xylene and xylene mixtures, benzene, toluene and other alkyl benzenes and solvent naphthas; commercially available hydrocarbon mixtures such as "white spirits."

The liquid may contain a minor proportion of an ester, ketone or alcohol, e.g. 2-ethoxy ethyl acetate, methyl isobutyl ketone or cetyl alcohol, and still retain its relatively non-polar character. However, as mentioned above, we prefer to limit the concentration of such compounds in the liquid to a maximum of 30% by weight.

The chain-like solvated components of the stabilizer are related to the nature of the inert organic liquid and the stabilizer to be used in the dispersion polymerization must contain a chain-like component solvated by such a liquid. Examples of such components are: polymers of long-chain esters of acrylic or methacrylic acid, e.g. stearyl, lauryl, octyl, 2-ethyl hexyl and hexyl esters of (meth)acrylic acid; polymers of vinyl alkyl esters of long-chain acids, e.g. vinyl stearate; polymers of ethylene, propylene, butadiene and isoprene; long-chain fatty acids and self-esters of hydroxy fatty acids, e.g. self-esters of 12-hydroxy stearic acid; aromatic polyesters, e.g. oil-modified alkyd resins; aromatic polyethers and polycarbonates and polymers of styrene and vinyl toluene.

By polymers we mean polymeric products which may contain as few as three or four, but usually contain ten or more, repeating monomeric units per molecule.

In general, conventional polymerization initiators, chain transfer agents, etc. may be used in the dispersion polymerization process, provided they do not react with the reactive group which must be subsequently reacted with the unsaturated component and a detailed description of the dispersion polymerization process is given in the above-mentioned co-pending Australian applications.

Co-reaction of the chemically reactive group of the addition polymer with the complementary reactive group borne by the cross-linking agent is carried out by adding the cross-linking agent to a dispersion of the addition polymer in the inert organic liquid, and where appropriate adding catalyst; and allowing the pairs of reactive groups to react at the chosen temperature until substantially all of the complementary reactive groups have reacted. Preferably the co-reaction is carried out in an inert atmosphere.

The amount of cross-linking agent to be co-reacted with each addition polymer molecule will depend on the degree of cross-linking required in the derivative, which in turn depends on the end use to which the polymer is to be put. On average, each polymer molecule must be reacted with at least one cross-linking agent molecule.

The disperse particles of cross-linked polymer may be separated as particulate solids from the dispersion by suitable mechanical means. For example the organic liquid may be removed by evaporation below the softening point of the particles, optionally under reduced pressure, or by flash-drying.

Because the stabilizer remains associated with the dried solid particles, the particles may be re-dispersed in an organic liquid of the type used in preparing the dispersion and will be self-stabilized therein. When the stabilizer comprises a stabilizer as herein defined and in addition meets the requirements of a stabilizer in which the stabilizer provides one or more components which in the presence of a hydrophilic liquid are solvated by the liquid and are present in the stabilizer in a proportion of 25% or more of the total weight of stabilizer, the particulate solid will additionally be re-dispersible in hydrophilic liquids.

The polymeric particles of this invention are particularly useful as components of surface coatings. For example by adjustment of addition polymer reaction conditions and stabilizer concentration, particles of cross-linked polymer of pre-determined sizes ranging from approximately 0.005 to 10.0 microns in diameter may be prepared.

When a dispersion containing such disperse polymer particles, optionally in the presence of a coalescing agent or plasticizer for the polymer, forms coalesced films at application temperature on evaporation of the organic liquid, the dispersions may be used as surface coating materials, pigmented in the conventional manner. Powdered particles of cross-linked polymer may be added to surface coatings comprising solutions of film-forming polymer, for example to increase the polymeric solids of coating materials without substantially increasing their viscosity. The cross-linked particles preferably have a physical affinity for and form a coherent part of a coating film formed from such a mixture. That is, particles of cross-linked polymer embedded in the polymeric film should exhibit adhesion to the film-forming polymer. In general, this requirement is met if the particles are of similar composition to and/or of similar polarity to that of the dissolved film-forming polymer. Cohesion of the film is favored if a polar interaction is generated between the cross-linked polymer and the major film-forming polymer. The methods of generating polar interactions between polymers is discussed in U.S. patent application No. 525,315 filed Feb. 7, 1966, now abandoned, the principles of which are applicable to the above polymer systems. Because of their cross-linked structure the disperse polymer particles resist solution in the solvents in which the main film-former is dissolved. Polymer particles used in this way are usually more highly cross-linked than those used as described above as sole film-formers.

The major film-forming materials used in surface coatings usually have a glass transition temperature above ambient temperature, e.g. higher than 25° C., to provide films of high gloss, hardness and good weathering resistance. It is usual to improve the flexibility of such films by adding to the coating composition a plasticizer for the film-forming polymer, but such additions involve a compromise between, for example, hardness, flexibility and film softness. The plasticizers are also prone to discoloration and migration from the applied surface coating. In one application of this invention the plasticizer of a surface coating may be replaced, at least in part, by particles of cross-linked polymer prepared as disclosed herein, which are rubbery and have a relatively low glass transition temperature. As described above, the cross-linked polymer particles are preferably compatible with and have an affinity for the main film-forming polymer. The rubbery particles may be incorporated in either solutions or dispersions of film-forming polymer. For example a major film-former comprising a solution in aromatic/polar solvents of poly(methyl methacrylate/methacrylic acid) may be increased in flexibility and toughness by adding to it a dispersion in an aliphatic hydrocarbon liquid of a poly(ethyl acrylate/glycidyl methacrylate) cross-linked with sebacic acid. Polar interaction between the major film-former and the cross-linked polymer is generated between carboxyl groups in the film-former and hydroxyl groups in the cross-linked polymer. Similarly, a solution in aromatic/polar solvents of the above film-former may be modified with particles of poly(ethoxy-ethyl methacrylate/ethyl acrylate/maleic anhydride)

cross-linked with n-butyl amine. Polar interaction is generated between carboxyl groups of the major film-former and amide groups of the cross-linked polymer particles. In general we prefer to add 5–15% (by weight) of cross-linked polymer particles to the major film-forming polymer, producing films of increased impact resistance and equivalent tensile strength to those formed from the unmodified film-forming polymer.

In a preferred embodiment of our invention the cross-linked polymer is cross-linkable by an autoxidative or free radical initiated reaction. This may be achieved in two ways.

In the first, in addition to providing the complementary chemically reactive groups to cross-link the addition polymer the cross-linking agent also comprises an autoxidative entity or an entity containing a carbon-carbon double bond which will enter into free radical initiated addition reactions.

The autoxidative entity may comprise a chain-like or cyclic entity which is known to undergo an oxidative reaction in the presence of oxygen, optionally accelerated by the addition of an autoxidation catalyst.

Suitable chain-like entities are unsaturated paraffinic chains derived from natural drying oils, e.g. tall oil, soya bean oil, safflower oil and linseed oil, although synthetic unsaturated chain-like entities of a similar nature may be used. Less preferred chain-like entities are those derived from the conjugated paraffinic chains of tung oil, oiticica oil and dehydrated castor oil.

Thus suitable cross-linking agents are, for example, drying oil fatty acid modified alkyd resins, containing free carboxyl groups, preferably with an acid value exceeding 30 mg. KOH per gm. and drying oil fatty acid modified epoxy resins having at least two residual epoxide groups per molecule.

Other suitable autoxidative cross-linking agents are allylic compounds, for example glycerol monoallyl ether and pentaerythritol diallyl ether.

The autoxidative entities may be cyclic. For example they may be vinyl dioxolanes or dioxanes derived from unsaturated aldehydes and polyols or their glycidyl derivatives, e.g. 5 - methylol-5-methyl-2-vinyl-1,3-dioxane, 2-vinyl-4-(buton)-1-ol)-1,3-dioxolane or 2(4-methyl vinyl)-4-(buton-1-ol)-1,3-dioxolane. Attached to this autoxidative entity are at least two complementary chemically reactive groups chosen by conventional chemical principles so as not to interfere with the chemical stability of the autoxidative entity.

Described broadly a preferred entity containing a carbon-carbon double bond which will enter into free radical initiated addition reactions would be, for example a material comprising an ethylenic double bond attached to such additional atoms as serve to link it to the cross-linking agent as a whole, e.g. an acrylate or methacrylate residue.

Polymerization of the double bond is initiated by, for example, free radicals formed by the reaciton in the presence of oxygen of autoxidative materials or by the decomposition of an organic peroxide or bis-azonitrile, e.g. benzoyl peroxide or azodiisobutyronitrile.

Suitable cross-linking agents of the above type are, for example, pentaerythritol di-(meth)acrylate and a polymer or oligomer of glycidyl (meth)acrylate in which at least one of the epoxide groups has been reacted with (meth)acrylic acid.

Preferably the free radical initiated addition reaction is carried out in the presence of an optional $\alpha,\beta$-ethylenically unsaturated monomer, e.g. styrene, $\alpha$-methyl styrene and esters of acrylic and methacrylic acid, which provides a further control over the properties of the polymeric product formed. The monomer may contain two such unsaturated groups, e.g. divinyl benzene, to further cross-link the disperse polymer.

In the second, chemically reactive groups of the disperse polymer are co-reacted with at least one component comprising a single complementary chemically reactive group which is monofunctional with respect to the co-reaction together with an unsaturated entity which is an autoxidative entity or an entity containing a carbon-carbon double bond which will enter into free radical initiated addition reactions.

The co-reaction may be carried out concurrent with or subsequent to the cross-linking reaction, the nature of the complementary chemically reactive groups and the reaction conditions being as described hereinabove with reference to the cross-linking reaction. Suitable autoxidative entities and entities which will enter into free-radical initiated addition reactions have been described hereinabove.

Alternatively, both methods may be used in the same dispersion.

In this embodiment of the invention, when the unsaturated entity is autoxidative, the cross-linked polymer particles will be similarly autoxidative and cure in the presence of air to further cross-link the particles. The degree of autoxidation achieved may not, however, be as great as would be expected from the weight of unsaturated component used, due to the inhibiting effect on the polymer mobility of the cross-links formed therein. Especially when the unsaturated component comprises chain-like unsaturated paraffinic entities these may be solvated by the liquid of the dispersion, thereby inducing some swelling of the polymer particles, at least temporarily increasing their rubbery nature.

When the unsaturated component contains a carbon-carbon double bond which is able to enter into a subsequent addition reaction in the presence of a source of free radicals, cross-linked polymer dispersions of this type, provided they integrate at ambient temperature to provide coherent films, are particularly suited to the preparation of non-thermoplastic surface coatings. For example if a dispersion of poly(methyl methacrylate/glycidyl methacrylate) in which a portion of the epoxide groups has been reacted with methacrylic acid to introduce polymerizable double bonds into the molecule is cross-linked with, for example, n-butyl amine and then mixed with benzoyl peroxide and optionally with methyl methacrylate monomer a hard coating may be formed on a substrate, additionally cross-linked by an addition reaction of the unsaturated group of the methacrylic acid residue. By choice of the optional $\alpha,\beta$-ethylenically unsaturated monomer and the concentration of that monomer, both the length and flexibility of the cross-links may be varied.

For example if styrene is used as the optional monomer the cross-links will be rigid whereas relatively flexible cross-links are provided by for example 2-ethyl hexyl acrylate, di-n-butyl maleate and lauryl methacrylate. Combinations of monomers of each type in varying proportions may also be used to provide cross-links of intermediate flexibility.

It will be understood that according to the reaction conditions and the reactivity ratios of the co-reactants that some degree of grafting of branch chains of polymerized monomer may take place in addition to the cross-linking reaction and under certain reaction conditions a major proportion of the optional monomer may be so-present in the cured, cross-linked derivative.

Again, if a dispersion of the above cross-linked addition polymer is prepared in which both autoxidative fatty chains and methacrylic acid residues are present, optionally with the inclusion of an autoxidation catalyst and an $\alpha,\beta$-ethylenically unsaturated monomer, a cross-linked polymer may be formed in which the cross-links result partially from autoxidation of the autoxidative chains and partially by an addition reaction initiated by free radicals generated by the autoxidation process.

When the disperse polymer is autoxidative, care must be exercised when drying the dispersion to provide redispersible disperse solids that the process is carried out in an inert atmosphere and below the temperature at which thermal polymerization of the polymer is known to take place.

The invention is illustrated by the following examples in which all parts are by weight.

EXAMPLE 1

Preparation of a dispersion of poly(methyl methacrylate/maleic anhydride) modified with β-hydroxy ethyl acrylate and cross-linked with hexamethylene diamine.

Stabilizer preparation

A self-polyester of 12-hydroxy stearic acid of molecular weight about 1700 condensed with glycidyl methacrylate to introduce a polymerizable bond (hereinafter referred to as monomer A) was copolymerized with methyl methacrylate and maleic anhydride in the ratio by weight of 50:46:4 in the presence of n-butyl acetate, ethyl acetate and N,N-dimethyl formamide in the weight proportion 1:2:0.3.

A 50% solution of a polymeric stabilizer of molecular weight about 30,000 was formed (stabilizer solution A).

Dispersion preparation

A mixture of: | Parts
--- | ---
Stabilizer solution A (above) | 1.84
Aliphatic hydrocarbon (boiling range 140°–205° C., aromatics content 17%) | 70.4
Aliphatic hydrocarbon (boiling range 160°–177° C., no aromatics) | 136.0
Aliphatic hydrocarbon (boiling range 40°–60° C., no aromatics) | 83.3
Methyl methacrylate | 8.45
Maleic anhydride | 3.72
N,N-dimethyl formamide | 10.0
Azodiisobutyronitrile | 1.0 was added to a reaction vessel fitted with a reflux condenser heated to reflux and held at reflux for 20 minutes. A very fine cloud of disperse polymer formed.

The following mixtures:

(1) | Parts
--- | ---
Stabilizer solution A (above) | 46.0
Methyl methacrylate | 189.5
Maleic anhydride | 81.5
n-Butyl acetate | 35.0
N,N-dimethyl formamide | 10.5
n-Octyl mercaptan (10% solution in aliphatic hydrocarbon) | 3.33

(2) | Parts
--- | ---
Methyl methacrylate | 23.25
Azodiisobutyronitrile | 1.5 were added separately and concurrently at a uniform rate over a period of three hours to the refluxing contents of the reaction vessel in such a manner that the mixture feed was well diluted by the reflux return. Refluxing was continued for a further 30 minutes. A stable 50% solids dispersion of the modified copolymer of methyl methacrylate and maleic anhydride was obtained.

Polymer modification 800 parts of the above polymer dispersion were placed in a reaction vessel fitted with a mechanical stirrer and reflux condenser and heated to 105° C. The reaction vessel was purged with oxygen-free nitrogen, the flow of nitrogen being continued throughout the entire reaction period.

The following mixture: | Parts
--- | ---
β-Hydroxy ethyl acrylate | 106.5
Hydroquinone | 0.1 was heated to 90° C. and added to the hot polymer dispersion. The temperature was increased to 115° C. and maintained for six hours.

After the six hours reaction period 11.6 parts of hexamethylene diamine were added and the reaction continued at 115° C. for a further six hours.

A stable dispersion of cross-linked polymer was formed, the polymer providing unsaturated components capable of entering into a further free radical initiated addition reaction.

One effect of the cross-linking reaction on the physical properties of the disperse polymer was demonstrated by checking the solubility in acetone in a Soxhlet extractor of dry films prepared from samples of the dispersion taken before and after cross-linking. Prior to cross-linking the polymer was readily attacked by acetone whereas the cross-linked polymer was insoluble in acetone under the conditions of the test.

EXAMPLE 2

The procedure of Example 1 was repeated but the disperse polymer of the stable dispersion so-produced was more highly cross-linked by increasing the proportion of hexamethylene diamine in the example from 11.6 parts to 23.2 parts.

EXAMPLE 3

Preparation of a dispersion of poly(methyl methacrylate/maleic anhydride) modified with ethylene glycol mono-allyl ether and cross-linked with 1-4 butylene glycol.

800.0 parts of the polymer dispersion of Example 1 were placed in a reaction vessel fitted with a mechanical stirrer and reflux condenser and heated to 105° C. The reaction vessel was purged with oxygen-free nitrogen, the flow of nitrogen being continued throughout the entire reaction period.

The following mixture: | Parts
--- | ---
1-4 butylene glycol | 3.68
Ethylene glycol mono-allyl ether | 98.7
Ethylene glycol diacetate | 31.0
Aliphatic hydrocarbon (boiling range 140°–205° C., aromatics content 17%) | 240.0
Hydroquinone | 0.1 was heated to 90° C. and added to the hot polymer dispersion. The temperature was increased to 115° C. and maintained for a further six hours.

A stable dispersion of cross-linked polymer was formed, the polymer providing unsaturated autoxidative components.

EXAMPLE 4

The procedure of Example 3 was repeated but the disperse polymer of the stable dispersion so-produced was more highly cross-linked by increasing the proportion of 1-4 butylene glycol in the example from 3.68 parts to 11.0 parts.

EXAMPLE 5

Preparation of a dispersion of poly(vinyl acetate/maleic anhydride) modified with ethylene glycol mono-allyl ether and cross-linked with diethylene glycol.

Dispersion preparation

A mixture of: | Parts
--- | ---
Stabilizer solution A (from Example 1) | 1.84
Aliphatic hydrocarbon (boiling range 140°–205° C., aromatics content 17%) | 70.4
Aliphatic hydrocarbon (boiling range 160°–177° C., no aromatics) | 136.0
Aliphatic hydrocarbon (boiling range 40°–60° C., no aromatics) | 83.3
Vinyl acetate | 8.6
Maleic anhydride | 2.0
N,N-dimethyl formamide | 10.0
Azodiisobutyronitrile | 1.0 was added to a reaction vessel fitted with a reflux condenser, heated to reflux and held at reflux for 20 minutes. A very fine cloud of disperse polymer formed.

The following mixtures:

(1)

| | Parts |
|---|---|
| Stabilizer solution A (from Example 1) | 46.0 |
| Vinyl acetate | 162.1 |
| Maleic anhydride | 47.3 |
| n-Butyl acetate | 35.0 |
| N,N-dimethyl formamide | 10.5 |
| Primary octyl mercaptan (10% solution in aliphatic hydrocarbon) | 3.3 |

(2)

| | Parts |
|---|---|
| Vinyl acetate | 22.5 |
| Azodiisobutyronitrile | 1.5 | were added separately and concurrently at a uniform rate over a period of three hours to the refluxing contents of the reaction vessel in such a manner that the mixture feed was well diluted by the reflux return. Refluxing continued for a further 30 minutes. A stable 43% solids dispersion of the copolymer of vinyl acetate and maleic anhydride was obtained.

Polymer modification 800.0 parts of the polymer dispersion were placed in a reaction vessel fitted with a mechanical stirrer and reflux condenser and heated to 105° C. The reaction vessel was purged with oxygen-free nitrogen, the flow of nitrogen being continued throughout the entire reaction period.

| The following mixture: | Parts |
|---|---|
| Di-ethylene glycol | 3.07 |
| Ethylene glycol mono-allyl ether | 53.17 |
| Ethylene glycol diacetate | 31.0 |
| Aliphatic hydrocarbon (boiling range 140°–205° C., aromatics content 17%) | 240.0 |
| Hydroquinone | 0.1 | was heated to 90° C. and added to the hot polymer dispersion. The temperature was increased to 115° C. and maintained for six hours.

A stable dispersion of cross-linked polymer was formed, the polymer providing unsaturated autoxidative components.

EXAMPLE 6

Preparation of a dispersion of poly(methyl methacrylate/glycidyl methacrylate) modified with methacrylic acid and cross-linked with n-butyl amine.

Stabilizer preparation

By the general method of Example 1 a solution of a stabilizer was prepared from monomer A, methyl methacrylate and glycidyl methacrylate in the weight proportion of 48/48/4. This solution will be referred to as stabilizer solution B.

Dispersion preparation

| A mixture of: | Parts |
|---|---|
| Stabilizer solution B (as above) | 8.0 |
| Aliphatic hydrocarbon (boiling range 140°–205° C., aromatics content 17%) | 412.0 |
| Aliphatic hydrocarbon (boiling range 160°–177° C., no aromatics) | 200.0 |
| Aliphatic hydrocarbon (boiling range 40°–60° C., no aromatics) | 270.0 |
| Methyl methacrylate | 22.7 |
| Glycidyl methacrylate | 9.7 |
| Azodiisobutylronitrile | 3.0 | was added to a reaction vessel fitted with a reflux condenser, heated to reflux and held at reflux for 20 minutes. A very fine cloud of disperse polymer formed.

| The following mixture: | Parts |
|---|---|
| Stabilizer solution B (as above) | 138.0 |
| Methyl methacrylate | 490.0 |
| Glycidyl methacrylate | 210.0 |
| Azodiisobutyronitrile | 3.0 |
| Primary octyl mercaptan (10% solution in aliphatic hydrocarbon) | 10.0 | was added at a uniform rate over a period of three hours to the refluxing contents of the reaction vessel in such a manner that the mixture feed was well diluted by the reflux return. Refluxing was continued for a further 30 minutes. A stable 49% solids dispersion of methyl methacrylate and glycidyl methacrylate copolymer was obtained.

Polymer modification 800.0 parts of the above polymer dispersion were placed in a reaction vessel fitted with a mechanical stirrer and reflux condenser and heated to 105° C. The reaction vessel was purged with oxygen-free nitrogen, the flow of nitrogen being continued throughout the entire reaction period.

| The following mixture: | Parts |
|---|---|
| Ethylene glycol diacetate | 31.0 |
| Aliphatic hydrocarbon (boiling range 140°–205° C., aromatics content 17%) | 240.0 |
| Methacrylic acid | 54.5 |
| Hydroquinone | 0.1 | was heated to 90° C. and added to the hot polymer dispersion. The temperature was increased to 115° C. and maintained for six hours.

After the six hours reaction period 3.65 parts of n-butyl amine were added and the reaction was continued at 115° C. for a further six hours.

A stable dispersion of cross-linked polymer was formed, the polymer providing unsaturated components capable of entering into a further free radical initiated addition reaction.

EXAMPLE 7

The procedure of Example 6 was repeated but the disperse polymer of the stable dispersion so-produced was more highly cross-linked by increasing the proportion of n-butyl amine in the example from 3.65 parts to 15.4 parts.

EXAMPLE 8

Preparation of a dispersion of poly(methyl methacrylate/glycidyl methacrylate) modified with tall oil fatty acids and methacrylic acid and cross-linked with sebacic acid.

Stabilizer preparation

Monomer A of Example 1 was copolymerized with methyl methacrylate and glycidyl methacrylate in the ratio by weight of 50:46:4 in the presence of n-butyl acetate and ethyl acetate in the weight proportion of 1:2. A 50% solution of a polymeric stabilizer of molecular weight about 30,000 was formed. The stabilizer so-produced was then modified to introduce therein polymerizable double bonds in the following manner.

| The following mixture: | Parts |
|---|---|
| Stabilizer solution (above) | 200 |
| n-Butyl acetate | 112 |
| Methacrylic acid | 1 |
| Hydroquinone | 0.02 |
| Coconut fatty acid tertiary amine | 0.10 | was heated to reflux (approximately 110° C.) in a reaction vessel fitted with a reflux condenser and held at reflux for five hours. The solution of stabilizer so-formed will be referred to as stabilizer solution C.

Dispersion preparation

A mixture of: Parts
Stabilizer solution C (as above) _____ 8.0
Aliphatic hydrocarbon (boiling range 140°–205° C., aromatics content 17%) _____ 412.0
Aliphatic hydrocarbon (boiling range 160°–177° C., no aromatics) _____ 200.0
Aliphatic hydrocarbon (boiling range 40°–60° C., no aromatics) _____ 270.0
Methyl methacrylate _____ 22.7
Glycidyl methacrylate _____ 9.7
Azodiisobutyronitrile _____ 3.0 was added to a reaction vessel fitted with reflux condenser, heated to reflux and held at reflux for 20 minutes. A very fine cloud of disperse polymer formed.

The following mixture: Parts
Stabilizer solution C (above) _____ 138.0
Methyl methacrylate _____ 490.0
Glycidyl methacrylate _____ 210.0
Azodiisobutyronitrile _____ 3.0
Primary octyl mercaptan (10% solution in aliphatic hydrocarbon) _____ 10.0 was added at a uniform rate over a period of three hours to the refluxing contents of the reaction vessel in such a manner that the mixture feed was well diluted by the reflux return. Refluxing was continued for a further 30 minutes.

A stable 49% solids dispersion of methyl methacrylate and glycidyl methacrylate copolymer was obtained, in which the stabilizer associated with and was also covalently linked to the disperse polymer.

Polymer modification 800.0 parts of the above polymer dispersion were placed in a reaction vessel fitted with a mechanical stirrer and reflux condenser and heated to 105° C. The reaction vessel was purged with oxygen-free nitrogen, the flow of nitrogen being continued throughout the entire reaction period.

The following mixture: Parts
Sebacic acid _____ 10
Methacrylic acid _____ 33.6
Tall oil fatty acid _____ 28.0
Aliphatic hydrocarbon (boiling range 140°–205° C., aromatics content 17%) _____ 240.0
Hydroquinone _____ 0.1 was heated to 90° C. and added to the hot polymer dispersion. The temperature was increased to 115° C. and maintained for a further six hours.

A stable dispersion of cross-linked polymer was formed, the polymer providing unsaturated autoxidative components and additionally unsaturated components capable of entering into a further free radical initiated addition reaction.

EXAMPLE 9

Preparation of a dispersion of poly(methyl methacrylate/glycidyl methacrylate) modified with tall oil fatty acids and methacrylic acid and cross-linked with "dimer" fatty acids. "Dimer" fatty acids are commercial dimerized fatty acids in which the fatty acids are joined through reactions of the fatty chains themselves, to form essentially dicarboxylic molecules.

800 parts of the polymer dispersion of Example 8 were placed in a reaction vessel fitted with a mechanical stirrer and reflux condenser and heated to 105° C. The reaction vessel was purged with oxygen-free nitrogen, the flow of nitrogen being continued throughout the entire reaction period.

The following mixture: Parts
Dimer fatty acids _____ 37
Methacrylic acid _____ 33.6
Tall oil fatty acid _____ 14.0
Aliphatic hydrocarbon (boiling range 140°–205° C., aromatics content 17%) _____ 240.0
Hydroquinone _____ 0.1 was heated to 90° C. and added to the hot polymer dispersion. The temperature was increased to 115° C. and maintained for a further six hours.

A stable dispersion of cross-linked polymer was formed, the polymer providing unsaturated autoxidative components and additionally unsaturated components capable of entering into a further free radical initiated addition reaction.

EXAMPLE 10

Preparation of a dispersion of poly(ethyl acrylate/glycidyl acrylate) modified with methacrylic acid and dimer fatty acids.

Stabilizer preparation

A self-polyester of 12-hydroxy stearic acid of molecular weight about 1700 condensed with glycidyl methacrylate to introduce a polymerizable bond (hereinafter referred to as monomer A) was copolymerized with methyl methacrylate and methacrylic acid in the ratio by weight of 50:46:4 in the presence of n-butyl acetate and ethyl acetate in the weight proportions 1:2.

A 50% solution of a polymeric stabilizer of molecular weight about 30,000 was formed (stabilizer solution A).

Dispersion preparation

A mixture of: Parts
Stabilizer solution A (above) _____ 1.83
Aliphatic hydrocarbon (boiling range 140°–205° C., aromatics content 17%) _____ 55.3
Aliphatic hydrocarbon (boiling range 160°–177° C., no aromatics) _____ 126.0
Aliphatic hydrocarbon (boiling range 40°–60° C., no aromatics) _____ 83.3
n-Butanol _____ 22.4
Ethyl acrylate _____ 6.48
Glycidyl acrylate _____ 4.32
Azodiisobutyronitrile _____ 0.9 was added to a reaction vessel fitted with mechanical stirrer and reflux condenser, heated to reflux and held at reflux for 20 minutes. A very fine cloud of dispersed polymer was formed.

The following mixture: Parts
Stabilizer solution A (above) _____ 33.3
Ethyl acrylate _____ 141.4
Glycidyl acrylate _____ 93.3
Azodiisobutyronitrile _____ 1.0 was added at a uniform rate over a period of three hours to the refluxing contents of the reaction vessel in such a manner that the mixture feed was well diluted by the reflux return. Refluxing was continued for a further 30 minutes. A stable 45% solids dispersion formed.

Polymer modification 800.0 parts of the above polymer dispersion was placed in a reaction vessel fitted with a mechanical stirrer and reflux condenser and heated to 105° C. The reaction vessel was purged with oxygen-free nitrogen, the flow of nitrogen being continued throughout the entire reaction period.

| The following mixture: | Parts |
|---|---|
| Ethylene glycol diacetate | 35.0 |
| Methacrylic acid | 69.3 |
| Dimer fatty acids | 37.6 |
| Aliphatic hydrocarbon (boiling range 140°–205° C., aromatics content 17%) | 160.0 |
| Hydroquinone | 0.1 | was heated to 90° C. and added to the hot polymer dispersion. The temperature was increased to 115° C. and maintained for a further six hours.

A stable dispersion of cross-linked polymer was formed, the polymer providing unsaturated components capable of entering into a further free radical initiated addition reaction.

EXAMPLE 11

Preparation of a dispersion of poly(ethyl acrylate/glycidyl acrylate) modified with methacrylic acid and cross-linked with dimer fatty acids.

800.0 parts of the polymer dispersion from Example 10 were placed in a reaction vessel fitted with a mechanical stirrer and reflux condenser and heated to 105° C. The reaction vessel was purged with oxygen-free nitrogen, the flow of nitrogen being continued throughout the entire raction period.

| The following mixture: | Parts |
|---|---|
| Ethylene glycol diacetate | 35.0 |
| Methacrylic acid | 46.22 |
| Dimer fatty acids | 150.5 |
| Aliphatic hydrocarbon (boiling range 140°–205° C., aromatics content 17%) | 160.0 |
| Hydroquinone | 0.1 | was heated to 90° C. and added to the hot polymer dispersion. The temperature was increased to 115° C. and maintained for a further six hours.

A stable dispersion of cross-linked polymer was formed, the polymer providing unsaturated components capable of entering into a further free radical initiated addition reaction.

EXAMPLE 12

Preparation of a dispersion of poly(ethyl acrylate/glycidyl acrylate) cross-linked with hexamethylene diamine.

800.0 parts of the polymer dispersion from Example 10 were placed in a reaction vessel fitted with a mechanical stirrer and reflux condenser and heated to 105° C. The reaction vessel was purged with oxygen-free nitrogen, the flow of nitrogen being continued throughout the entire reaction period.

| The following mixture: | Parts |
|---|---|
| Hexamethylene diamine | 31.2 |
| Ethylene glycol diacetate | 35.0 |
| Aliphatic hydrocarbon (boiling range 140°–205° C., aromatics content 17%) | 160.0 |
| Hydroquinone | 0.1 | was heated to 90° C. and added to the hot polymer dispersion. The temperature was increased to 115° C. and maintained for a further six hours.

A stable dispersion of cross-linked polymer was formed.

EXAMPLE 13

Preparation of dispersion of poly(ethyl acrylate/glycidyl methacrylate) modified with an autoxidative oil acids modified alkyd resin.

Alkyd preparation

| A mixture of: | Parts |
|---|---|
| Soya oil fatty acids | 596 |
| Phthalic anhydride | 680 |
| Pentaerythritol | 150 |
| Glycerol | 348 | was placed in a reaction vessel fitted with mechanical stirrer, reflux condenser and water trap. An addition of 5% by weight of the charge of xylene was made and the batch heated to 210° C. Water evolved was removed via the water trap and the reaction continued until a sample of the solid resin had an acid value of 20 mg. KOH per gm. Additional xylene was added as required to maintain a steady reflux at 210° C. The batch was then cooled to room temperature and adjusted to 60% total solids by weight with xylene.

Polymer modification 800 parts of the dispersion of un-cross-linked addition polymer of Example 10 (a copolymer of ethyl acrylate and glycidyl acrylate) were placed in a reaction vessel fitted with a mechanical stirrer and reflux condenser and heated under an atmosphere of oxygen-free nitrogen to 105° C.

| A mixture of: | Parts |
|---|---|
| Alkyd resin solution (above) | 70.0 |
| Ethylene glycol diacetate | 35.0 |
| Aliphatic hydrocarbon (aromatics free and boiling range 140°–205° C.) | 160.0 |
| Hydroquinone | 0.1 | was heated to 90° C. and added to the batch. The temperature was increased to 115° C. and maintained for a further six hours.

A stable dispersion of cross-linked polymer able to further cross-link by an autoxidative reaction was formed.

EXAMPLE 14

The effect on the physical properties of a paint film of blending with the paint a proportion of a dispersion of a cross-linked polymer prepared according to this invention is demonstrated.

A dispersion of poly(methyl methacrylate) in a substantially aliphatic hydrocarbon liquid and plasticized with approximately 15% by weight (based on the polymer solids) of n-butyl benzyl phthalate was diluted with 15% by weight (based on the polymer solids) of a 1:1 by weight mixture of ethylene glycol diacetate and butylene glycol diacetate, the total solids of the dispersion being 46% by weight. The dispersion was pigmented with r-titania, phthalocyanine blue and carbon black pigments to produce a light blue paint of approximately 7% by weight pigment content, referred to hereinunder as the "control."

To 180 parts of the control were added 20 parts of the dispersion of cross-linked polymer of Example 11 to provide the "test" paint.

Films of the control and test paint were cast on steel strip and force-dried at 60° C. to provide dry films of approximately 2 thou. thickness. The elastic recovery of the two films over a range of temperatures was compared using a micro-indentation apparatus in which a ball was pressed into the film and then withdrawn under standardized testing conditions and the ratio of elastic recovery to total indentation determined. A suitable apparatus is described in the Journal of the Oil and Colour Chemists' Association, 48, 6, June 1965.

The results of the test were as follows:

| Temperature in °C. | Ratio of elastic recovery to total identation | |
|---|---|---|
| | Control paint | Test paint |
| 12 | 78 | 69 |
| 22 | 71 | 67 |
| 30 | 65 | 63 |
| 39 | 60 | 59 |
| 50 | 38 | 46 |
| 57 | 32 | 43 |
| 65 | 26 | 34 |

It will be seen that use of the cross-linked polymer prepared according to this invention markedly improved the recovery from deformation of the control paint to which it had been added at temperatures at least as low as 50° C.

We claim:

1. A process of preparing stable dispersions of particles of cross-linked addition polymer in an organic liquid by dispersion polymerization of α,β-ethylenically unsaturated monomer in an inert substantially non-polar organic liquid in which the monomer is soluble and the resulting polymer is insoluble and in the presence of a stabilizer to provide an addition polymer containing an average of at least one chemically reactive group per polymer molecule said stabilizer being a stabilizer for particles of said addition polymer and comprising an anchoring component which becomes associated with the polymer particles and a pendant chain-like component which is solvated by said organic liquid and which provides a stabilizing sheath around said particles, the stabilization provided by said stabilizer being sufficient that it prevents gelation and coagulation when, to 132 parts of said dispersion at 50% by weight solids, there are added 90 parts by weight of a mixture of equal parts by weight of n-butyl benzyl phthalate, 2-ethoxy ethanol acetate and aliphatic hydrocarbon and the treated dispersion is stored in an oven at 45° C. for 48 hours, and reacting with the polymer so-formed at least one cross-linking agent bearing complementary chemically reactive groups, said agent being at least difunctional with respect to the cross-linking reaction.

2. A process according to clam 1 in which the addition polymer is swollen by the addition to the dispersion of up to 25% by weight, based on the weight of disperse polymer, of a swelling agent for the polymer, before the cross-linking reaction is carried out.

3. A process according to claim 1 in which the co-reaction of disperse polymer and cross-linking agent is an addition reaction between pairs of complementary chemically reactive groups.

4. A process according to claim 1 in which the cross-linking agent is a drying oil modified alkyd or epoxy resin.

5. A process according to claim 1 in which the cross-linking agent comprises in addition to the complementary reactive groups a polymerizable ethylenic double bond.

6. A process according to claim 1 in which the cross-linking agent comprises in addition to the complementary chemically reactive groups an entity which in the presence of oxygen undergoes an autoxidative reaction.

7. A process according to claim 6 in which the entity that in the presence of oxygen undergoes an autoxidative reaction is an unsaturated paraffinic chain containing 1 to 3 double bonds.

8. A process according to claim 6 in which the entity that in the presence of oxygen undergoes an autoxidative reaction is a dioxane or a dioxolane.

9. Stable dispersions comprising particles of cross-linked addition polymer in an organic liquid in which the polymer is insoluble and a stabilizer, said stabilizer being a stabilizer for particles of said addition polymer and comprising an anchoring component which becomes associated with the polymer particles and a pendant chain-like component which is solvated by said organic liquid and which provides a stabilizing sheath around said particles, the stabilization provided by said stabilizer being sufficient that it prevents gelation and coagulation when, to 132 parts of said dispersion at 50% by weight solids there are added 90 parts by weight of a mixture of equal parts by weight of n-butyl benzyl phthalate, 2-ethoxy ethanol acetate and aliphatic hydrocarbon and the tested dispersion is stored in an oven at 45° C. for 48 hours, and further characterized in that an average of at least one chemically reactive group per addition polymer molecule has been co-reacted with a cross-linking agent bearing complementary chemically reactive groups to cross-link the addition polymer, said agent being at least difunctional with respect to the cross-linking reaction.

10. Stable dispersions according to claim 9 in which the cross-linked polymer comprises entities which, in the presence of oxygen, undergo an autoxidation reaction.

11. Stable dispersions according to claim 9 in which the cross-linked polymer comprises entities which will enter into free radical initiated addition reactions.

12. Stable dispersions according to claim 9 in which the addition polymer is able to enter into both an autoxidative and a free radical initiated cross-linking reaction.

13. As particulate solids, cross-linked addition polymer provided by drying polymer dispersions prepared according to claim 1.

14. A coated surface comprising a film on a substrate, the film comprising a film-forming polymeric material there being embedded in the film-forming polymeric material from 5–15% by weight of the total film of cross-linked polymer particles as prepared by a process according to claim 1.

References Cited

UNITED STATES PATENTS

| 3,095,388 | 6/1963 | Osmond et al. | 260—33.6 |
| 3,218,287 | 11/1965 | Schmidle et al. | 260—33.6 |
| 3,232,903 | 2/1966 | Schmidle et al. | 260—33.6 |
| 3,255,135 | 6/1966 | Schmidle et al. | 260—23 |
| 3,264,234 | 8/1966 | Osmond | 260—22 |
| 3,317,635 | 5/1967 | Osmond | 260—23 |
| 3,393,162 | 7/1968 | Cox et al. | 260—4 |
| 3,399,163 | 8/1968 | Cousens et al. | 260—33.6 |
| 3,405,087 | 10/1968 | Fryd | 260—33.6 |
| 3,419,515 | 12/1968 | Schmidle et al. | 260—33.6 |
| 3,433,753 | 3/1969 | Farkas et al. | 260—22 |

FOREIGN PATENTS

| 653,709 | 12/1962 | Canada | 260—23 |

DONALD E. CZAJA, Primary Examiner

R. W. GRIFFIN, Assistant Examiner

U.S. Cl. X.R.

117—132 B, 161 K, 161 UZ, 161 ZB; 260—23 EM, 32.8 R, 33.4 R, 33.6 UA, 33.6 R, 836, 873, 875